(12) United States Patent
Wong et al.

(10) Patent No.: US 7,021,803 B2
(45) Date of Patent: Apr. 4, 2006

(54) METHOD AND APPARATUS OF AERODYNAMIC HEADLIGHT HOUSINGS FOR VEHICLES

(75) Inventors: Alec C. Wong, Bellevue, WA (US); Daniel Farmer, Coupeville, WA (US)

(73) Assignee: PACCAR Inc, Bellevue, WA (US)

( * ) Notice: Subject to any disclaimer, the term of this patent is extended or adjusted under 35 U.S.C. 154(b) by 17 days.

(21) Appl. No.: 10/729,731

(22) Filed: Dec. 5, 2003

(65) Prior Publication Data
US 2005/0122730 A1 Jun. 9, 2005

(51) Int. Cl.
*B60Q 1/00* (2006.01)
(52) U.S. Cl. .................. 362/507; 362/485; 362/496; 362/506; 362/546; 362/549
(58) Field of Classification Search ............. 362/506, 362/507, 546–549, 485, 496; D26/35
See application file for complete search history.

(56) References Cited

U.S. PATENT DOCUMENTS

| | | | |
|---|---|---|---|
| 1,110,227 A | 9/1914 | Pike | |
| 2,020,897 A | 11/1935 | Lint | |
| 2,254,569 A | 9/1941 | Genda | |
| 2,270,587 A | 1/1942 | Hall | |
| 4,797,792 A | 1/1989 | Oen | |
| D308,422 S * | 6/1990 | Sasamura | D26/35 |

* cited by examiner

*Primary Examiner*—Thomas M. Sember
*Assistant Examiner*—James W. Cranson, Jr.
(74) *Attorney, Agent, or Firm*—Christensen O'Connor Johnson Kindness PLLC

(57) ABSTRACT

A headlight housing (10) is provided. The housing is adapted to be mounted upon a vehicle, the vehicle adapted to ride upon a ground surface (20). The housing includes a front section (12) adapted to emit light from a headlight (24). The housing also includes a top surface (14) of a substantially constant width extending aft of a top edge (11) of the front section, wherein the top surface is oriented substantially parallel with the ground surface when mounted upon the vehicle in an illuminating position. The housing further includes a bottom surface (16) of a substantially constant width extending aft of a bottom edge (34) of the front surface, wherein the bottom surface approaches the top surface as the top and bottom surfaces extend aft to taper a height of the housing. The method of positioning a headlight housing in an aerodynamic position is also disclosed.

43 Claims, 6 Drawing Sheets

METHOD AND APPARATUS OF AERODYNAMIC HEADLIGHT HOUSINGS FOR VEHICLES

FIELD OF THE INVENTION

The present invention relates generally to headlight housings and methods for positioning same, and more particularly, to headlight housings having an aerodynamic shape and methods for positioning same for improved aerodynamics.

BACKGROUND OF THE INVENTION

Prior to the 1960s, heavy duty trucks, such as Class 8 trucks, typically incorporated headlights for providing driving visibility in pods placed in front of and/or above the truck's fenders. To reduce drag, these headlight housings were often tear drop in shape. In the 1960s, most heavy-duty truck manufacturers eliminated the use of headlight pods, opting to flush mount the headlights in the truck body, such as mounting the headlights in the fenders of the truck. The impetus behind the relocation of the headlights was two part. First, the headlights were relocated to enhance the appearance of the truck. Second, truck manufacturers' discovered that headlight housings increased drag (even with the tear drop shape) and reduced fuel economy since the headlight housings increased both the surface area and complexity of the front end of the truck. However, many users find pod headlight housings aesthetically pleasing on a truck. Therefore, there exists a need for both an aerodynamically shaped pod headlight housing and a method for aerodynamically placing pod headlights which maintains the "traditional" truck appearance without resulting in a significant penalty in aerodynamic drag.

SUMMARY OF THE INVENTION

One embodiment of a headlight housing formed in accordance with the present invention is provided. The headlight housing is adapted to be mounted upon a vehicle, the vehicle adapted to ride upon a ground surface. The headlight housing includes a front section adapted to emit light from a headlight. The headlight housing also includes a top surface of a substantially constant width extending aft of a top edge of the front section, wherein the top surface is adapted to be oriented substantially parallel with the ground surface when mounted upon the vehicle in an illuminating position. The headlight housing also includes a bottom surface of a substantially constant width extending aft of a bottom edge of the front surface, wherein the bottom surface approaches the top surface as the top and bottom surfaces extend aft to taper a height of the headlight housing in an aft direction.

Another embodiment of a headlight housing formed in accordance with the present invention is provided. The headlight housing is adapted to be mounted upon a vehicle adapted to ride upon a ground surface. The headlight housing includes a front section adapted to emit light from a headlight. The headlight housing further includes a substantially planar top surface extending aft of a top edge of the front section, wherein the top surface is located substantially perpendicular to a plane containing the front section. The headlight housing also includes a bottom surface extending aft of a bottom edge of the front section, the bottom surface located at an acute angle relative to the top surface.

Yet another embodiment of a headlight housing formed in accordance with the present invention is provided. The headlight housing is adapted to be mounted upon a vehicle, the vehicle adapted to ride upon a ground surface. The headlight housing includes a front section adapted to emit light from a headlight. The headlight housing further includes a top surface having a substantially constant width extending aft of a top edge of the front section. The top surface is adapted to be oriented substantially perpendicular to the front section and substantially parallel with the ground surface when mounted upon the vehicle in an illuminating position. The headlight housing additionally includes a bottom surface having a substantially constant width. The bottom surface extends aft of a bottom edge of the front surface. The bottom surface is inclined relative to the ground surface at an average angle of 10 degrees or more such that the bottom surface approaches the top surface as the top and bottom surfaces extend aft to taper a height of the headlight housing in an aft direction.

One embodiment of a front section of a vehicle formed in accordance with the present invention is provided. The vehicle is adapted to roll upon a ground surface. The front section of the vehicle includes a fender having an outer surface, a top point; and a bottom leading edge. The front section includes a headlight housing having an outer surface. The outer surface includes a top point. The top point of the fender and the top point of the headlight housing are both at substantially equal elevations above the ground surface. A ratio between a gap disposed between the outer surface of the headlight housing and the outer surface of the fender relative to an opening disposed between the outer surface of the headlight housing and the bottom leading edge is between 1:1 and 1:7.

One embodiment of a method performed in accordance with the present invention for positioning a headlight housing in an aerodynamic position relative to a fender of a vehicle is provided. The vehicle is adapted to roll upon a ground surface, and the headlight housing includes an outer surface having a top surface and a bottom surface. The fender includes a bottom leading edge and an outer surface having a top point. The method includes placing a top point of the top surface of the headlight housing at an elevation above the ground surface substantially equal to an elevation of the top point of the fender above the ground surface. The method further includes positioning a bottom point of the bottom surface of the headlight housing at a selected height above the bottom leading edge of the fender. The method additionally includes aligning the headlight housing relative to the fender such that a gap is present between the outer surface of the fender and the outer surface of the headlight housing, wherein a ratio between the gap and the selected height is between about 1:1 to about 1:7.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
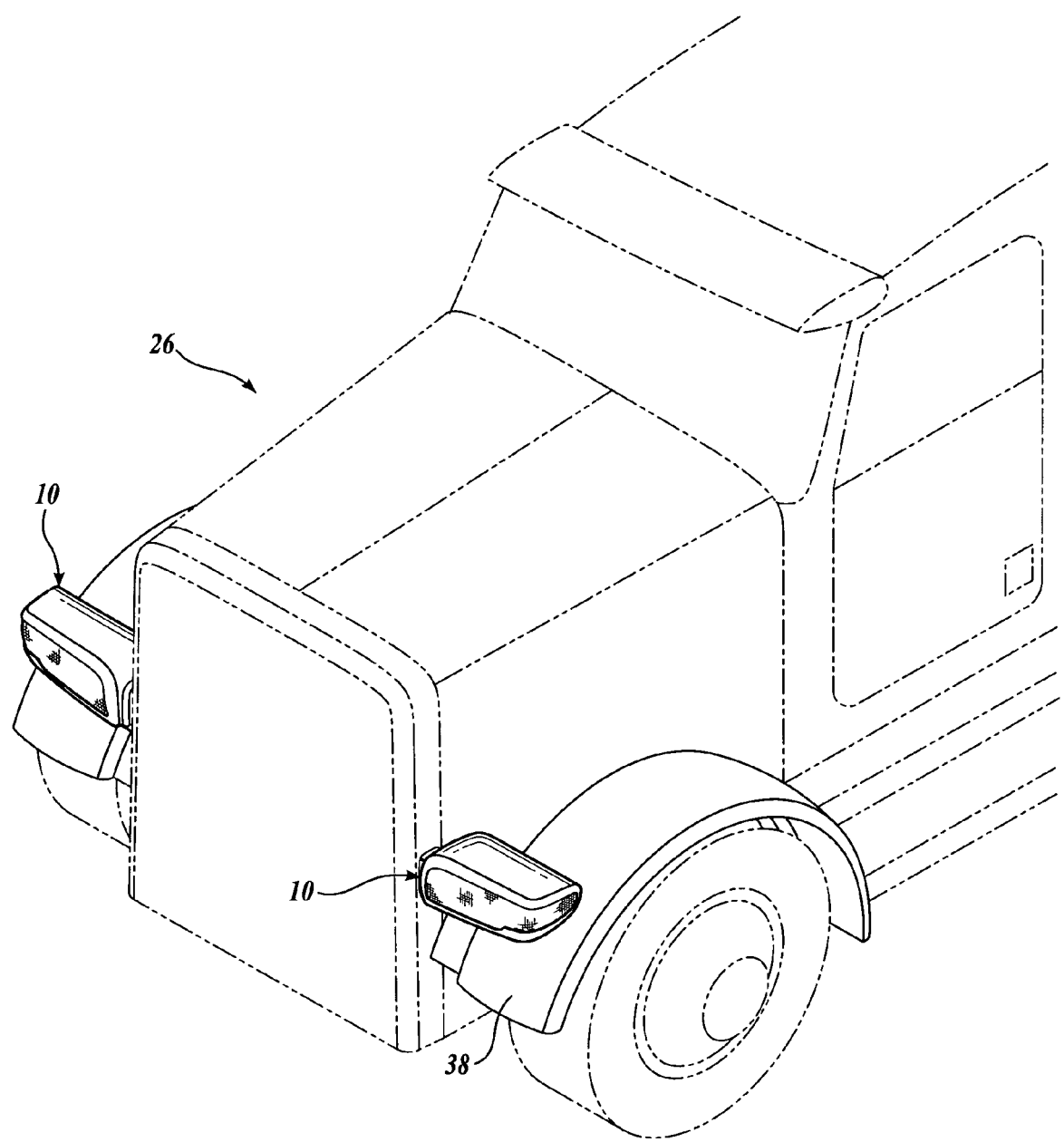
FIG. 1 is a perspective view of one embodiment of an aerodynamic headlight housing formed and located upon a vehicle in accordance with the present invention.

FIGS. 1–4 illustrate one embodiment of an aerodynamic headlight housing 10 formed and located in an aerodynamic position in accordance with the present invention. Referring to FIG. 1, although the illustrated embodiment of the present invention is described as implemented with a Class 8 truck 26, one skilled in the relevant art will appreciate that the disclosed aerodynamic headlight housing 10 and the disclosed method for placing headlight housings 10 in an aerodynamic location relative to a fender 38 are illustrative in nature and should not be construed as limited to application with Class 8 trucks 26. It should therefore be apparent that the method and apparatus of an aerodynamic headlight housing 10 has wide application, and may be used in any situation wherein the use of an aerodynamic headlight housing 10 and/or placement of a headlight housing in an aerodynamic location is desired.

Figure 2:
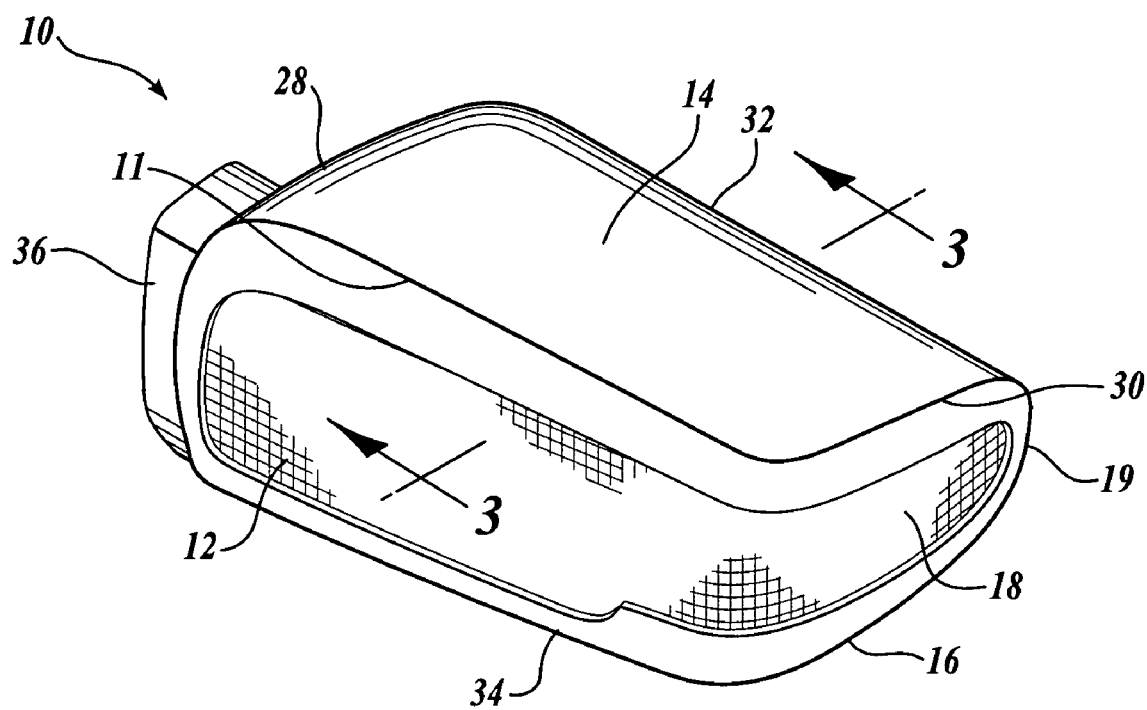
FIG. 2 is a perspective view of the aerodynamic headlight housing of FIG. 1.
Figure 3:
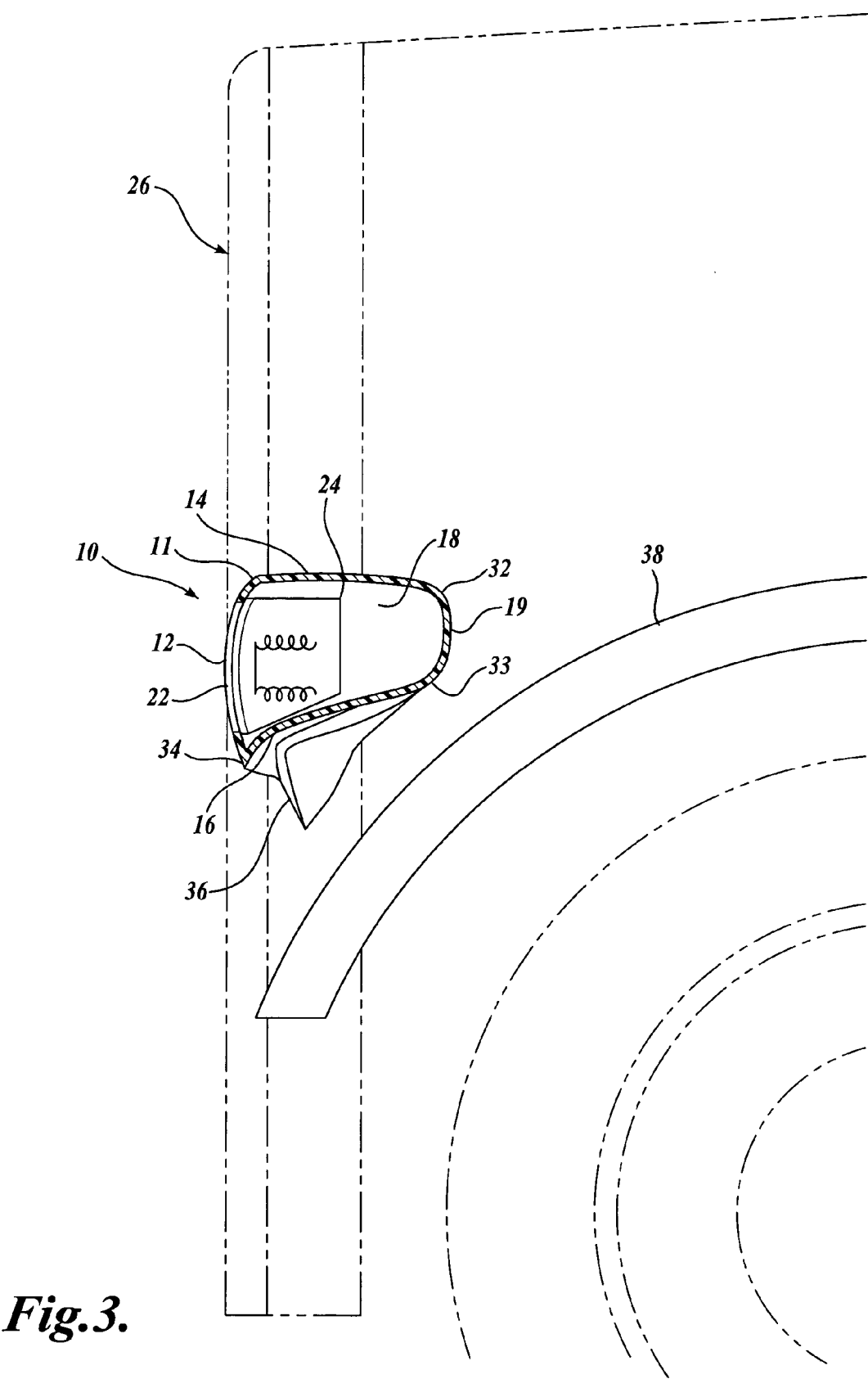
FIG. 3 is a cross-sectional view of the aerodynamic headlight housing of FIG. 2 taken substantially through Section 3—3 of FIG. 2.

Referring to FIGS. 2 and 3, one embodiment of an aerodynamic headlight housing 10 formed in accordance with the present invention is depicted. The aerodynamic headlight housing 10 is generally a six-sided, block structure having a substantially quadrilateral cross-section. For the purpose of this detailed description, the sides of the block structure are designated as follows: a front section 12, a top surface 14, a bottom surface 16, two side walls 18, and a back surface 19.

Figure 4:
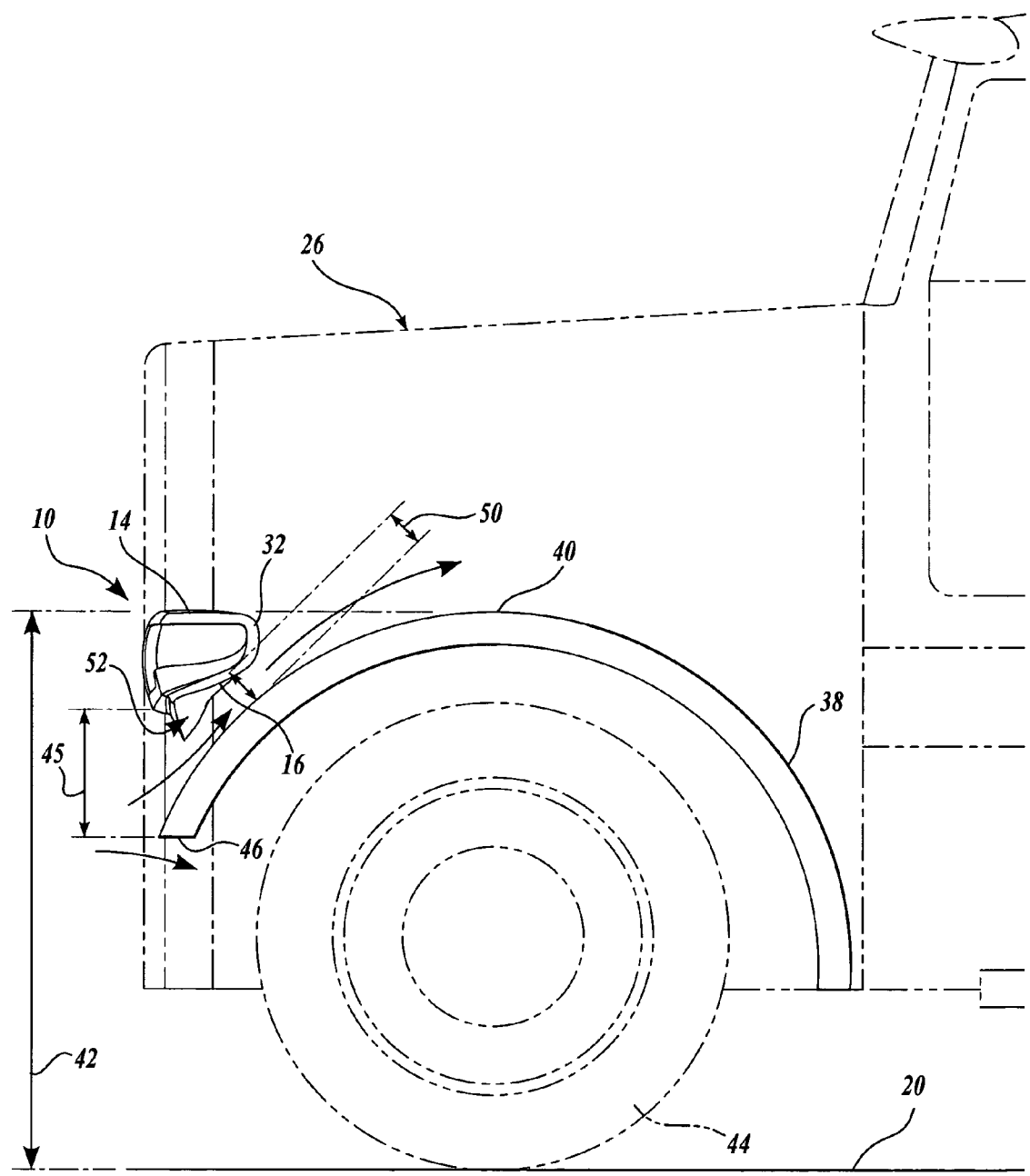
FIG. 4 is a side view of the aerodynamic headlight housing and vehicle shown in FIG. 1.

The front section 12 may be oriented substantially vertical, i.e. substantially perpendicular to a ground surface 20 (see FIG. 4). The front section 12 is preferably adapted to permit light from a light source, such as from a headlight, to shine therethrough. In the illustrated embodiment, as best shown in FIG. 3, the front section 12 is adapted to be disposed adjacent and/or just forward of a lens 22 of a headlight 24 disposed within the headlight housing 10. In another embodiment, the front section 12 is adapted to receive a lens 22 of a headlight 24, wherein the lens 22 partially forms the front section 12. The front section 12 may be generally rectangular in shape so as to have a generally constant height across the width of the front section 12 or may taper in height across the front section 12. For example, in the illustrated embodiment, the front section 12 tapers from a selected height to a shorter height across the width of the front section 12 as the front section 12 extends outward from the vehicle 26 (See FIG. 2). The front section 12 includes a top edge 11 and a bottom edge 34. The front section 12 may bow outward in the forward direction.

The top surface 14 may be oriented substantially horizontal and/or parallel relative to the ground surface 20 (see FIG. 4) when the headlight housing 10 is in an illuminating position. The illuminating position is one where the headlight housing 10 is oriented to direct light in front of the vehicle 26 to illuminate the vehicle's path. The top surface 14 may extend aft from the top edge 11 of the front section 12. The top surface 14 may be a generally planar, rectangular shaped surface or may be alternately shaped, such as to taper in width along a lateral axis of the top surface 14 such that an inboard edge 28 of the top surface 14 is longer than an outboard edge 30 of the top surface as is shown in the illustrated embodiment.

The bottom surface 16 of the aerodynamic headlight housing 10 may extend between a bottom edge 34 of the front section 12 and a bottom edge 33 of the back surface 19. The bottom surface 16 may be bowed inward toward a center of the aerodynamic headlight housing 10 (i.e., away from the fender 38) to produce an arcuate surface. This arcuate surface 16 may be used to aid in creating a nozzle-induced acceleration of the airflow as the airflow passes between the aerodynamic headlight housing 10 and the fender 38. This nozzle-induced acceleration of the airflow injects air between the aerodynamic headlight housing 10 and the fender 38, resulting in a delay of the separation of the boundary layer along the top surface of the fender 38 and a corresponding reduction in drag.

The bottom surface 16 of the aerodynamic headlight housing 10 is preferably inclined relative to the ground surface. Moreover, the bottom surface 10 is preferably inclined at an average angle of 10 degrees or more relative to the ground surface, with a preferred average angle of inclination of about 18 degrees.

As seen from FIG. 3, the aerodynamic headlight housing 10 may have a generally quadrilateral shaped cross-section, the cross-section tapering in height in an aft or longitudinal direction. In the illustrated embodiment, the front section 12, top surface 14, and back surface 19 are preferably oriented substantially perpendicular to one another. The bottom surface 16 is preferably located at an acute angle relative to the front section 12 and top surface and at an obtuse angle relative to the back surface 19. Thus, the height of the front section 12 may be greater than the height of the back surface 19. The fore and aft oriented cross-section of the aerodynamic headlight housing 10 may remain generally constant in area as the cross-section is taken at intervals laterally across the aerodynamic headlight housing, or may reduce in area as the aerodynamic headlight housing 10 extends outward.

The aerodynamic headlight housing 10 may include a mounting arm 36. The mounting arm 36 may be used to couple the aerodynamic headlight housing 10 to the vehicle. The mounting arm 36 may be hollow to permit devices to run therethrough, such as wires to provide electrical power to the headlight 24. The mounting arm 36 may be adapted to mount the aerodynamic headlight housing 10 in the illuminating position such that the headlight 24 positioned within the aerodynamic headlight housing 10 is directed in a forward direction to illuminate the path of the vehicle. The mounting arm 36 may be used to adjustably couple the aerodynamic headlight housing 10 to the vehicle such that the direction of light emitted from the aerodynamic headlight housing 10 may be selectively adjusted. Alternatively, as is well known to those skilled in the art, the headlight housing 10 may have adjustment mechanisms for adjusting the position of the headlight 24 within the aerodynamic headlight housing 10 to adjust the direction of light emitted. Preferably, the mounting arm 36 holds the aerodynamic headlight housing 10 in the illuminating position, and does not permit the aerodynamic headlight housing 10 to be actuated into a stowed position, wherein the aerodynamic headlight housing 10 is disposed flush with or below a body panel of the vehicle.

The aerodynamic headlight housing 10 may be made from any semi-rigid or rigid material, a few suitable examples being plastic, fiberglass, metal, etc.

Figure 5:
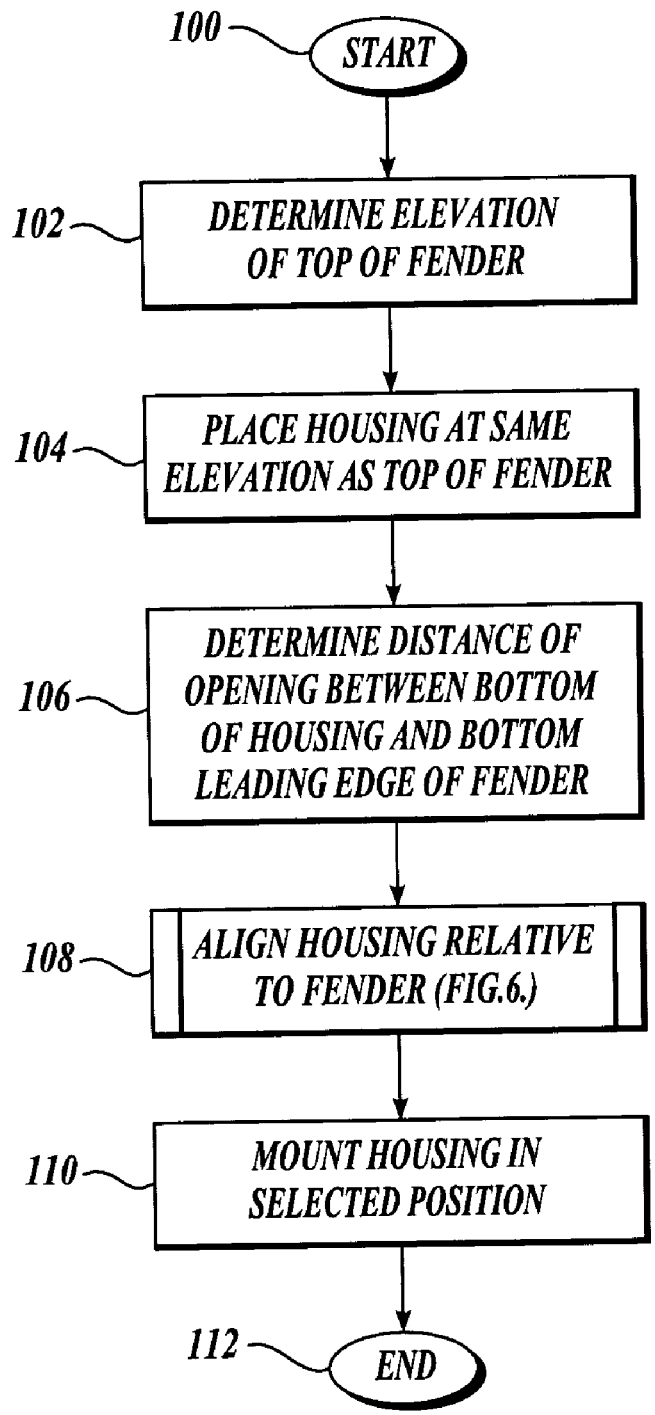
FIG. 5 is a functional flow diagram illustrating one embodiment of a process performed in accordance with the present invention for positioning an aerodynamic headlight housing in an aerodynamic location relative to a fender of a vehicle.

Preferably, the aerodynamic headlight housing 10 is positioned in an aerodynamic location upon the vehicle. Referring to FIGS. 4 and 5, one embodiment of a method of positioning the aerodynamic headlight housing 10 of the illustrated embodiment, or any other headlight housing, in an aerodynamic position upon the vehicle 26 will be described. Moreover, the method of the invention relates to the steps performed in placing a headlight housing 10 in relation to a fender 38 to reduce aerodynamic drag. This is done by selecting the location of the aerodynamic headlight housing 10 in accordance with the present invention to create controlled turbulence and airflow in such a manner as to minimize pressure changes at a top 40 of the vehicle fender 38.

Turning to FIG. 5, with reference to FIG. 4 for all reference numbers less than 100, the method of placing the aerodynamic headlight housing 10 in an aerodynamic position relative to the fender 38 will be described. Generally stated, FIG. 5 is a functional flow diagram illustrating the process performed in determining an aerodynamic location to place a headlight housing 10 in relation to a fender 38.

The process begins at block 100, wherein the process of determining an aerodynamic location to place the headlight housing 10 relative to the fender 38 is commenced. The process then proceeds to block 102, wherein an elevation 42 of the top 40 of the fender 38 above the ground surface 20 upon which the vehicle rides is determined. The top 40 of the fender 38 may be defined as a point on an outer surface of the fender 38 which represents the average height at which an airstream passes over the top of the fender 38 when the vehicle is rolling in a forward direction upon the ground surface 20. In determining the average height, appendages coupled to the fender 38, such as lights, which extend outward from the outer surface of the fender 38, are excluded.

The process then proceeds to block 104, wherein a top of the aerodynamic headlight housing 10 is placed at substantially the same elevation (i.e., within 3 inches) as the top 40 of the fender 38. In the illustrated embodiment, the top surface 14 of the headlight housing 10 is oriented parallel with the ground surface 20. Accordingly, determining the elevation of the top surface 14 is self evident. In the situation wherein the top surface 14 is irregular or inclined to the ground surface 20, the elevation of the top surface 14 is determined by measuring from a point on the headlight housing 10 which represents the average height at which an airstream passes over the top surface 14 of the headlight housing 10 when the vehicle is rolling in a forward direction upon the ground surface 20. In calculating the elevation of the top surface 14, any appendages coupled to the headlight housing 10, such as lights, are excluded.

The process then proceeds to block 106, wherein the distance of an opening 45 disposed between the bottom surface 16 of the headlight housing 10 and a bottom leading edge 46 of the fender 38 is determined. In determining the point on the bottom surface 16 to measure from, one should measure from a point which represents the average elevation at which air is allowed to pass substantially unobstructed under the aerodynamic headlight housing 10. Likewise, in determining the point on the bottom leading edge 46 of the fender 42 to measure from, one should measure from a point which represents the average elevation at which air is allowed to pass substantially unobstructed under the bottom leading edge 46 of the fender 42 towards the tire 44 housed in the fender 38.

The process then proceeds to block 108, wherein the headlight housing 10 is longitudinally aligned relative to the fender 38. Generally stated, at block 108, a longitudinal position of the headlight housing 10 relative to the fender 38 is determined such that a channel 52 formed between the headlight housing 10 and the fender 38 may be used to aid in creating a nozzle-induced acceleration of the airflow as the airflow passes between the aerodynamic headlight housing 10 and the fender 38. This nozzle-induced acceleration of the airflow injects air between the aerodynamic headlight housing 10 and the fender 38, resulting in a delay of the separation of the boundary layer along the top surface of the fender 38 and a corresponding reduction in drag.

Figure 6:
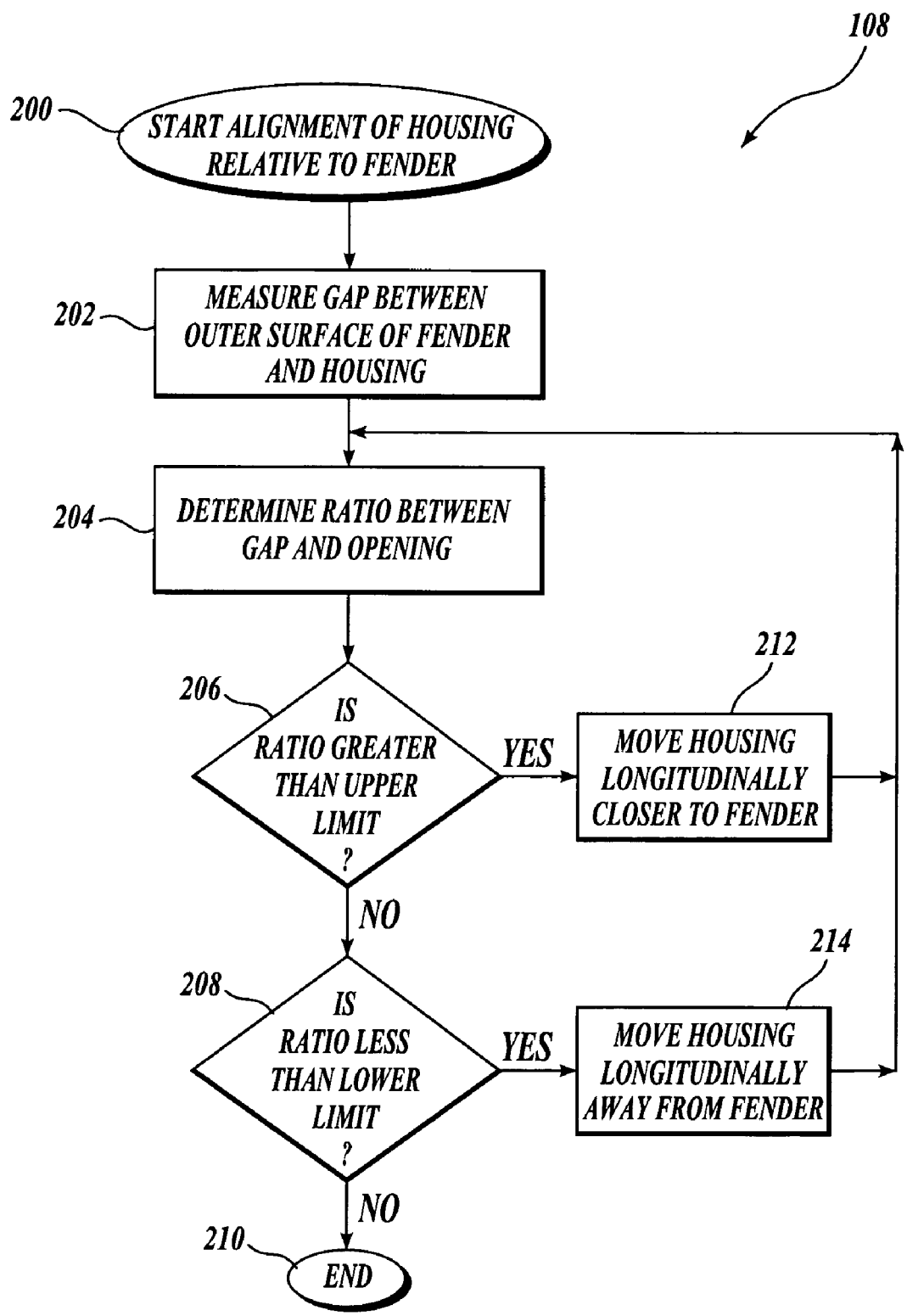
FIG. 6 is a functional flow diagram illustrating one embodiment of a subroutine performed in accordance with the present invention of the process depicted in FIG. 5.

The process of block 108 is accomplished by a subroutine, the subroutine described and depicted in relation to FIG. 6. Turning to FIG. 6, with continued reference to FIG. 4 for reference numbers less than 100, the subroutine 108 begins at block 200, wherein the process of aligning the headlight housing 10 relative to the fender 38 is initiated. The subroutine then proceeds to block 202, wherein a gap 50 between an outer surface of the fender 38 and an outer surface of the headlight housing 10 is measured. The gap 50 is preferably measured at the closest point of approach of the headlight housing 10 to the fender 38. This point forms a throat in the air passage or channel 52 disposed between the headlight housing 10 and the fender 38. The throat may be defined as the location of least flow area in the channel 52, i.e., the point wherein the airstream is at a peak velocity and minimum pressure in the channel 52.

The subroutine then proceeds to block 204, where a ratio between the gap 50 relative to the opening 45, defined above, is determined. The subroutine then proceeds to decision block 206. At decision block 206, the ratio is compared to a predetermined upper limit ratio, such as a ratio of 1:7. If the ratio is less than the predetermined upper limit ration, then the subroutine proceeds to block 208. If the ratio is greater than the predetermined upper limit ratio, then the subroutine proceeds to block 212. At block 212, the headlight housing 10 is moved toward the fender 38 a select distance in a longitudinal, or fore and aft, direction. This is done to decrease the ratio. The subroutine then proceeds to block 204 wherein the ratio of the gap to the opening is again determined. The subroutine then proceeds to decision block 206, wherein, as described above, the subroutine proceeds to either block 208 or block 212. Blocks 212, 204, and 206 are repeated in an iterative process until the ratio is brought below the predetermined upper limit ratio. Once the ratio is brought below the predetermined upper limit ratio, the subroutine proceeds to decision block 208.

At decision block 208, the ratio is compared to a predetermined lower limit ratio, such as 1:1. If the ratio is less than the predetermined upper limit ratio, then the subroutine then proceeds to block 214. At block 214, the headlight housing 10 is moved away from the fender 38 a selected distance in the longitudinal, or fore and aft direction. This is done to increase the ratio. The subroutine then proceeds to block 204 wherein the ratio of the gap to the opening is again determined. The subroutine then proceeds to decision block 206, wherein, as described above, the subroutine proceeds to either block 208 or block 212 depending upon the magnitude of the ratio. If the subroutine returns to decision block 208 and the ratio is greater than the lower predetermined limit ratio, than the headlight housing 10 is located in an aerodynamic location and the subroutine proceeds to block 210. At block 210 the subroutine 108 is terminated.

Turning to FIGS. 4 and 5, upon completion of the subroutine of block 108, the routine proceeds to block 110. At block 110, the headlight housing 10 is mounted in the aerodynamic location determined by the preceding steps of the routine. The routine then proceeds to block 112, wherein the routine is terminated.

Referring to FIG. 6, an upper limit ratio and a lower limit ratio are mentioned. As should be apparent to those skilled in the art, the upper and lower limit ratios may be varied from those disclosed above without departing from the spirit and scope of the present invention. In the illustrated embodiment formed in accordance with the present invention, the upper limit ratio is about 1:7. In other embodiments formed in accordance with the present invention, the upper limit ratio is less, such as about 1:6.5, 1:6, 1:5.5, 1:5, 1:4.5, 1:4, 1:3.5, 1:3, 1:2.5, 1:2, or 1:1.5. In the illustrated embodiment formed in accordance with the present invention, the lower limit ratio is about 1:1. In other embodiments formed in accordance with the present invention, the lower limit ratio is more, such as about 1:1.5, 1:2, 1:2.5, 1:3, 1:3.5, 1:4, 1:4.5, 1:5, 1:5.5, 1:6, or 1:6.5. Any lower limit ratio listed herein may be paired with any higher value upper limit ratio listed above.

For the purposes of this detailed description, the term substantially may be interpreted as follows. When the term substantially is referenced in relation to an elevation, the term substantially means that the elevations are within about three inches of one another. When the term substantially is referenced in relation to an inclination of one element to another element, the term substantially means that the elements are within about 25 degrees of one another.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A headlight housing adapted to be mounted upon a vehicle, the vehicle adapted to ride upon a ground surface, the headlight housing comprising:
   (a) a front section adapted to emit light from a headlight;
   (b) a top surface of a substantially constant width extending aft of a top edge of the front section to a back surface of the headlight housing, wherein the top surface extending aft of a top edge of the front section to a back surface of the headlight housing is adapted to be oriented substantially parallel with the ground surface when the headlight housing is mounted upon the vehicle in an illuminating position; and
   (c) a bottom surface of a substantially constant width extending aft of a bottom edge of the front section, wherein the bottom surface approaches the top surface as the top and bottom surfaces extend aft to taper a height of the headlight housing in an aft direction.

2. The headlight housing of claim 1, wherein the front section has a height which tapers along a width of the front section.

3. The headlight housing of claim 1, wherein the top and bottom surfaces join to the back surface, the back surface oriented substantially perpendicular to the ground surface.

4. The headlight housing of claim 1, wherein the headlight housing has a cross-section oriented in a fore and aft direction, wherein the cross-section substantially forms a quadrilateral shape.

5. The headlight housing of claim 1, wherein the headlight housing has a cross-section oriented in a fore and aft direction, wherein the cross-section substantially forms a quadrilateral shape having three sides oriented substantially perpendicular to one another and a remaining side oriented at an obtuse angle to one of the three sides.

6. The headlight housing of claim 1, wherein the headlight housing has a cross-section in a fore and aft direction, wherein the area of the cross-section of the headlight housing decreases in area as the cross-section is taken at spaced intervals outward from the vehicle across a majority of the width of the headlight housing.

7. The headlight housing of claim 1, wherein the bottom surface is bowed inward.

8. The headlight housing of claim 1, wherein the bottom surface is adapted to be inclined at an average of 10 degrees or more relative to the ground surface when the headlight housing is mounted upon the vehicle in the illuminating position.

9. The headlight housing of claim 1, wherein the headlight housing is adapted to remain fixed in the illuminating position once mounted upon the vehicle.

10. A headlight housing for mounting upon a vehicle adapted to ride upon a ground surface, the headlight housing comprising:
    (a) a front section adapted to emit light from a headlight;
    (b) a substantially planar top surface extending aft of a top edge of the front section to a back surface of the headlight housing, wherein the top surface extending aft of a top edge of the front section to a back surface of the headlight housing is located substantially perpendicular to a plane containing the front section; and
    (c) a bottom surface extending aft of a bottom edge of the front section, the bottom surface located at an acute angle relative to the top surface.

11. The headlight housing of claim 10, wherein the top surface is adapted to be oriented substantially parallel to the ground surface when the headlight housing is mounted upon the vehicle in an illuminating position.

12. The headlight housing of claim 10, wherein the headlight housing has a cross-section in a fore and aft direction that substantially forms a quadrilateral shape.

13. The headlight housing of claim 12, wherein the cross-section decreases in area as the cross-section is taken at spaced intervals outward from the vehicle across a width of the headlight housing.

14. The headlight housing of claim 10, wherein the bottom surface is bowed inward.

15. The headlight housing of claim 10, wherein the bottom surface is adapted to be inclined at an average of 10 degrees or more relative to the ground surface when the headlight housing is mounted upon the vehicle in an illuminating position.

16. The headlight housing of claim 10, wherein the headlight housing is adapted to remain fixed in an illuminating position once mounted upon the vehicle.

17. A headlight housing adapted to be mounted upon a vehicle, the vehicle adapted to ride upon a ground surface, the headlight housing comprising:
    (a) a front section adapted to emit light from a headlight;
    (b) a top surface having a substantially constant width extending aft of a top edge of the front section, wherein the top surface is adapted to be oriented substantially perpendicular to the front section and substantially parallel with the ground surface when mounted upon the vehicle in an illuminating position; and
    (c) a bottom surface having a substantially constant width, the bottom surface bowed inward and extending aft of a bottom edge of the front section, wherein the bottom surface is inclined relative to the ground surface at an average angle of 10 degrees or more such that the bottom surface approaches the top surface as the top and bottom surfaces extend aft to taper a height of the headlight housing in an aft direction.

18. A front section of a vehicle, the vehicle adapted to roll upon a ground surface, the front section of the vehicle comprising:
   (a) a fender having:
      (i) an outer surface;
      (ii) a top point; and
      (iii) a bottom leading edge;
   (b) a headlight housing having:
      (i) an outer surface; and
      (ii) a top point;
   (c) wherein the top point of the fender and the top point of the headlight housing are both at substantially equal elevations above the ground surface;
   (d) wherein a ratio between a gap disposed between the outer surface of the headlight housing and the outer surface of the fender relative to an opening disposed between the outer surface of the headlight housing and the bottom leading edge is between 1:1 and 1:7; and
   (e) wherein the headlight housing tapers in height from a front section of the headlight housing to a back surface of the headlight housing.

19. The front section of the vehicle of claim 18, wherein the ratio is between 1:2 and 1:6.

20. The front section of the vehicle of claim 18, wherein the ratio is between 1:3 and 1:5.

21. The front section of the vehicle of claim 18, wherein the ratio is between 1:3.5 and 1:4.5.

22. The front section of the vehicle of claim 18, wherein the top point of the fender and the top point of the headlight housing are both at substantially equal elevations above the ground surface such that the elevations are within two inches of one another.

23. The front section of the vehicle of claim 18, wherein the top most point of the fender and the top most point of the headlight housing are both at substantially equal elevations above the ground surface such that the elevations are within one inch of one another.

24. The front section of the vehicle of claim 18, wherein the outer surface of the headlight housing includes a bottom surface that is inclined at an average of 10 degrees or more relative to the ground surface.

25. The front section of the vehicle of claim 18, wherein the outer surface of the headlight housing includes a bottom surface that is bowed inward.

26. The front section of the vehicle of claim 18, wherein a fore and aft oriented cross-section of the headlight housing is substantially quadrilateral in shape, with two edges located substantially parallel to one another, and the other two edges inclined relative to one another.

27. A method of positioning a headlight housing in an aerodynamic position relative to a fender of a vehicle, wherein the vehicle is adapted to roll upon a ground surface, wherein the headlight housing includes an outer surface having a top surface and a bottom surface, and wherein the fender includes a bottom leading edge and an outer surface having a top point, the method comprising:
   (a) placing a top point of the top surface of the headlight housing at an elevation above the ground surface substantially equal to an elevation of the top point of the fender above the ground surface;
   (b) positioning a bottom point of the bottom surface of the headlight housing at a selected height above the bottom leading edge of the fender;
   (c) aligning the headlight housing relative to the fender such that a gap is present between the outer surface of the fender and the outer surface of the headlight housing, wherein a ratio between the gap and the selected height is between about 1:1 to about 1:7; and
   (d) orientating the bottom surface at an average inclination of 10 degrees or more relative to the ground surface.

28. The method of claim 27, wherein the top point of the top surface of the headlight housing is placed at an elevation substantially equal to the elevation of the top point of the fender such that the elevation of the top point of the top surface of the headlight housing is within two inches of the elevation of the top point of the fender.

29. The method of claim 27, wherein the top point of the top surface of the headlight housing is placed at an elevation substantially equal to the elevation of the top point of the fender such that the elevation of the top point of the top surface of the headlight housing is within one inch of the elevation of the top point of the fender.

30. The method of claim 27, wherein the ratio between the gap and the selected height is between about 1:1.5 to about 1:6.5.

31. The method of claim 27, wherein the ratio between the gap and the selected height is between about 1:2 to about 1:6.

32. The method of claim 27, wherein the ratio between the gap and the selected height is between about 1:2.5 to about 1:5.5.

33. The method of claim 27, wherein the ratio between the gap and the selected height is between about 1:3 to about 1:5.

34. The method of claim 27, wherein the ratio between the gap and the selected height is between about 1:3.5 to about 1:4.5.

35. The method of claim 27, wherein the bottom surface of the headlight housing is bowed inward.

36. The method of claim 27, wherein the headlight housing tapers in height from a front section of the headlight housing to a back surface of the headlight housing.

37. The method of claim 27, wherein a cross-section oriented in a fore and aft direction of the headlight housing is substantially quadrilateral in shape, with two edges located substantially parallel to one another, and the other two edges inclined relative to one another.

38. A front section of a vehicle, the vehicle adapted to roll upon a ground surface, the front section of the vehicle comprising:
   (a) a fender having:
      (i) an outer surface;
      (ii) a top point; and
      (iii) a bottom leading edge;
   (b) a headlight housing having:
      (i) an outer surface; and
      (ii) a top point;
   (c) wherein the top point of the fender and the top point of the headlight housing are both at substantially equal elevations above the ground surface;
   (d) wherein a ratio between a gap disposed between the outer surface of the headlight housing and the outer surface of the fender relative to an opening disposed between the outer surface of the headlight housing and the bottom leading edge is between 1:1 and 1:7; and
   (e) wherein the top point of the fender and the top point of the headlight housing are both at substantially equal elevations above the ground surface such that the elevations are within two inches of one another.

39. A front section of a vehicle, the vehicle adapted to roll upon a ground surface, the front section of the vehicle comprising:
- (a) a fender having:
  - (i) an outer surface;
  - (ii) a top point; and
  - (iii) a bottom leading edge;
- (b) a headlight housing having:
  - (i) an outer surface; and
  - (ii) a top point;
- (c) wherein the top point of the fender and the top point of the headlight housing are both at substantially equal elevations above the ground surface;
- (d) wherein a ratio between a gap disposed between the outer surface of the headlight housing and the outer surface of the fender relative to an opening disposed between the outer surface of the headlight housing and the bottom leading edge is between 1:1 and 1:7; and
- (e) wherein the outer surface of the headlight housing includes a bottom surface that is inclined at an average of 10 degrees or more relative to the ground surface.

40. A front section of a vehicle, the vehicle adapted to roll upon a ground surface, the front section of the vehicle comprising:
- (a) a fender having:
  - (i) an outer surface;
  - (ii) a top point; and
  - (iii) a bottom leading edge;
- (b) a headlight housing having:
  - (i) an outer surface; and
  - (ii) a top point;
- (c) wherein the top point of the fender and the top point of the headlight housing are both at substantially equal elevations above the ground surface;
- (d) wherein a ratio between a gap disposed between the outer surface of the headlight housing and the outer surface of the fender relative to an opening disposed between the outer surface of the headlight housing and the bottom leading edge is between 1:1 and 1:7; and
- (e) wherein the outer surface of the headlight housing includes a bottom surface that is bowed inward.

41. A front section of a vehicle, the vehicle adapted to roll upon a ground surface, the front section of the vehicle comprising:
- (a) a fender having:
  - (i) an outer surface;
  - (ii) a top point; and
  - (iii) a bottom leading edge;
- (b) a headlight housing having:
  - (i) an outer surface; and
  - (ii) a top point;
- (c) wherein the top point of the fender and the top point of the headlight housing are both at substantially equal elevations above the ground surface;
- (d) wherein a ratio between a gap disposed between the outer surface of the headlight housing and the outer surface of the fender relative to an opening disposed between the outer surface of the headlight housing and the bottom leading edge is between 1:1 and 1:7; and
- (e) wherein a fore and aft oriented cross-section of the headlight housing is substantially quadrilateral in shape, with two edges located substantially parallel to one another, and the other two edges inclined relative to one another.

42. A method of positioning a headlight housing in an aerodynamic position relative to a fender of a vehicle, wherein the vehicle is adapted to roll upon a ground surface, wherein the headlight housing includes an outer surface having a top surface and a bottom surface, and wherein the fender includes a bottom leading edge and an outer surface having a top point, the method comprising:
- (a) placing a top point of the top surface of the headlight housing at an elevation above the ground surface substantially equal to an elevation of the top point of the fender above the ground surface;
- (b) positioning a bottom point of the bottom surface of the headlight housing at a selected height above the bottom leading edge of the fender;
- (c) aligning the headlight housing relative to the fender such that a gap is present between the outer surface of the fender and the outer surface of the headlight housing, wherein a ratio between the gap and the selected height is between about 1:1 to about 1:7; and
- (d) wherein the top point of the top surface of the headlight housing is placed at an elevation substantially equal to the elevation of the top point of the fender such that the elevation of the top point of the top surface of the headlight housing is within two inches of the elevation of the top point of the fender.

43. A method of positioning a headlight housing in an aerodynamic position relative to a fender of a vehicle, wherein the vehicle is adapted to roll upon a ground surface, wherein the headlight housing includes an outer surface having a top surface and a bottom surface, and wherein the fender includes a bottom leading edge and an outer surface having a top point, the method comprising:
- (a) placing a top point of the top surface of the headlight housing at an elevation above the ground surface substantially equal to an elevation of the top point of the fender above the ground surface;
- (b) positioning a bottom point of the bottom surface of the headlight housing at a selected height above the bottom leading edge of the fender;
- (c) aligning the headlight housing relative to the fender such that a gap is present between the outer surface of the fender and the outer surface of the headlight housing, wherein a ratio between the gap and the selected height is between about 1:1 to about 1:7; and
- (d) wherein a cross-section oriented in a fore and aft direction of the headlight housing is substantially quadrilateral in shape, with two edges located substantially parallel to one another, and the other two edges inclined relative to one another.

* * * * *